June 15, 1926.
L. STANZEL ET AL
1,588,780
SHOCK AND REBOUND ABSORBER FOR AUTOMOBILES
Filed August 31, 1925
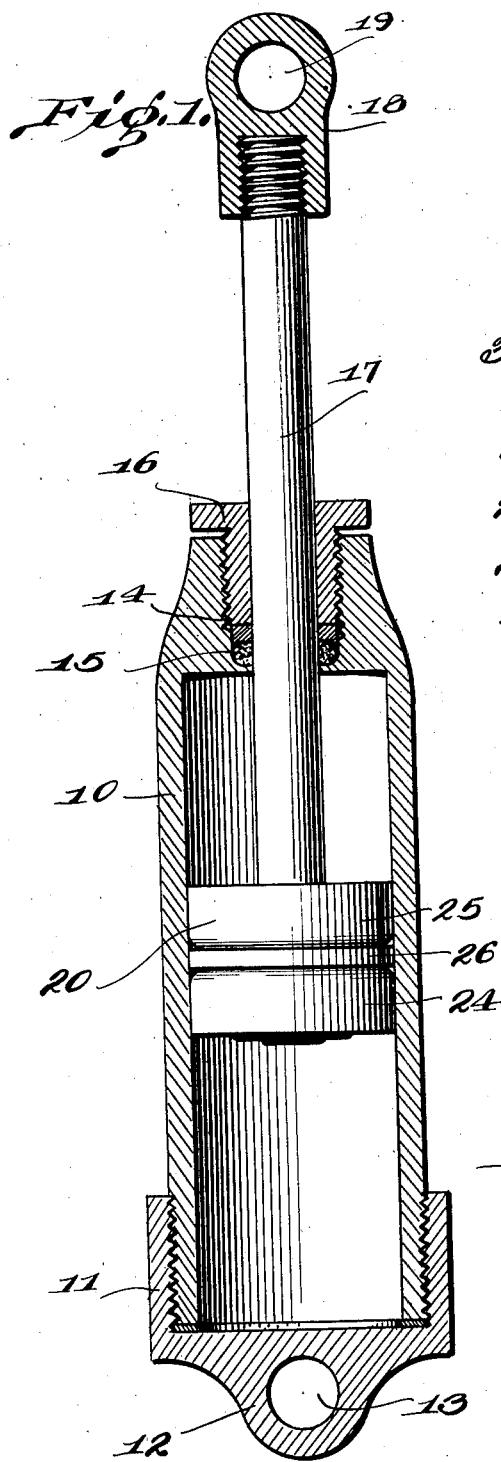
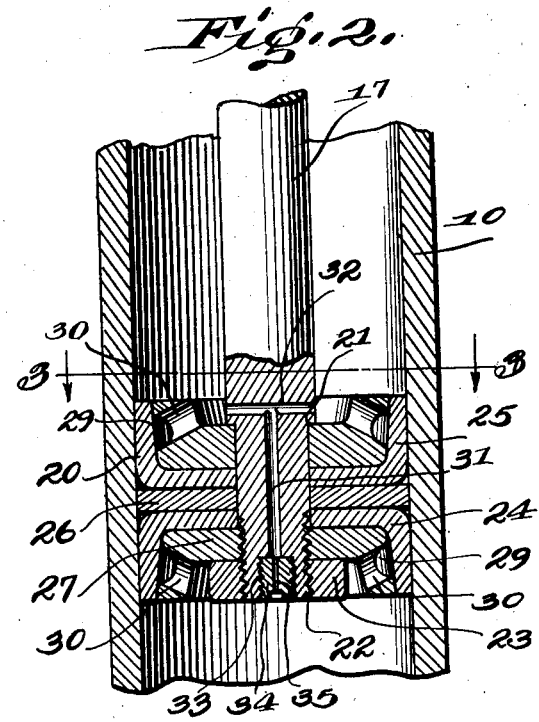
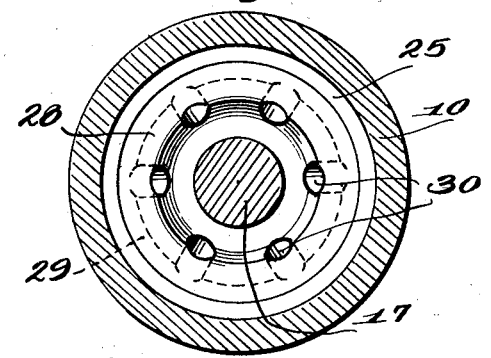
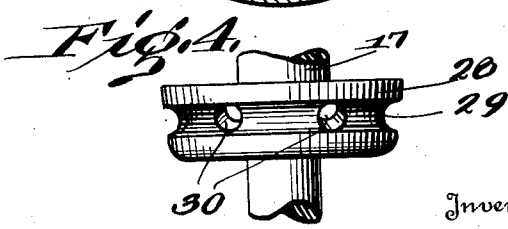
Inventor
Leopold Stanzel
Christian C. Johnson
By
Attorney Patented June 15, 1926.

1,588,780

UNITED STATES PATENT OFFICE.

LEOPOLD STANZEL AND CHRISTIAN C. JOHNSON, OF HOYT, KANSAS.

SHOCK AND REBOUND ABSORBER FOR AUTOMOBILES.

Application filed August 31, 1925. Serial No. 53,672.

The present invention relates to an absorber for use in connection with automobiles, and aims to provide a device of this character which is attached to the frame and axle of the automobile for efficiently absorbing both shocks and rebounds the axle is subjected to during the travel of the automobile over rough roads.

Another object of the invention is the provision of a cylindrical member having a plunger slidably mounted therein, said plunger being constructed so as to compress air in the end of the cylinder the same is forced towards, said plunger also having a restricted opening therein through which air may slowly escape to the opposite side of the plunger, which will eliminate sharp shocks and rebounds caused by rough roads.

A further object of the invention is to provide packing members carried by the plunger which are forced towards the interior wall of the cylinder by the air in the cylinder when the plunger is moved, so as to prevent leakage between the plunger and cylinder.

A still further object of the invention is the arranging of the restricted opening in the plunger so as to direct the air passing therethrough upon one of the packing members which will also aid in eliminating leakage between the plunger and cylinder.

It is also an object of the invention to provide a device of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a longitudinal section through my improved device,

Figure 2 is a fragmentary longitudinal section showing the plunger in section,

Figure 3 is a cross section taken on line 3—3 of Figure 2, and

Figure 4 is a detail view showing one of the members for holding the packing in place.

In carrying out the invention, the numeral 10 designates a cylindrical barrel which has one end thereof exteriorly screw threaded for receiving thereon a cap 11, said cap forming a means for closing the end of the cylindrical barrel to which the same is attached. Formed on the cap 11 is a depending lug 12 provided with a bearing 13 arranged therein for permitting the lower end of the cylindrical barrel to be pivotally connected to the axle of an automobile. The opposite end of the cylindrical barrel 10 has a reduced opening 14 extending therethrough which is adapted to receive therein packing 15 and a jam nut 16 threadedly mounted in the interior of the opening 14. The jam nut 16 has a bore arranged centrally therein which slidably receives a bar 17. Exteriorly screw threaded upon the upper end of the bar 17 is arranged a member 18 provided with a bearing 19 therein which will permit the upper end of the bar 17 to be pivotally connected to the frame of an automobile.

On the lower end of the bar 17 and positioned in the cylindrical barrel 10 is a plunger 20. The shaft 17 is reduced in size at its lower end so as to provide a shoulder 21 thereon, and has its lower extremity exteriorly screw threaded, as at 22, for receiving a nut 23 in order that the plunger structure may be clamped between the shoulder 21 and the nut 23. The plunger is constructed of a pair of leather members 24 and 25 having therebetween a center disk or washer 26 and members 27 and 28 for retaining the leather members 24 and 25 in their proper positions. The leather members 24 and 25 have their peripheries turned outwardly away from each other so as to provide annular flanges which frictionally engage the interior wall of the cylindrical barrel. The members 27 and 28 are arranged in the formation of cup-shaped members having an annular groove 29 provided around the periphery of each member, said grooves 29 communicating with annular disposed bores or openings 30 extending through the walls of the cup-shaped members. The lower cup-shaped member 27 is provided with screw threads which engage the threads 22 on the reduced end of the bar 17 so as to aid in clamping the leather members, washers, and other cup-shaped leather retaining member rigidly between the shoulder 21 and the same. The nut 23 may then act as a binding nut for locking the leather retaining member 27 against turning movement.

The reduced end of the bar 17 is provided with a longitudinal opening or bore 31 which communicates with a transverse bore 32 positioned slightly above the uppermost leather retaining member 28. The lower entrance of the bore 31 is enlarged, as at 33, and is provided with screw threads for receiving a plug 34 having a restricted opening 35 extending therethrough and communicating with the bore 31. From this arrangement it can be seen that air is permitted to pass from either side of the plunger to the other side in a slow and restricted manner.

In operation, the device is attached to an automobile, the upper end of the bar 17 being connected to the frame of the automobile, while the lower end of the cylindrical barrel is connected to the axle of the automobile. When a wheel of the vehicle engages an obstruction in the road, the cylindrical barrel 10 will be forced upwardly causing the plunger 20 to be slid therein. After the shocks the rebounds will be absorbed as the plunger is permitted to return to its normal position in a very slow manner. When the plunger is forced in either direction in the cylindrical barrel, the air in the end of the barrel towards which the plunger is forced will be compressed, causing the air to pass direct upon the flange of the leather member at the compressed end of the plunger to be forced in binding contact with the interior wall of the cylindrical barrel, thus eliminating to a great extent any leakage which may pass between the plunger and cylindrical barrel.

It is to be noted that the transverse bore 32 in the bar 17 is arranged so as to direct the air passing therethrough through the openings 30 and directly upon the flange of the leather member 25, thus aiding in forcing said flange against the interior of the cylindrical barrel. The plug 34 may be removed should it be desired to adjust the absorber to make the same more or less yieldable, the size of the openings through the plug governing the pressure necessary to move the plunger in the cylindrical barrel.

Having thus described our invention, what we claim as new is:

1. A shock and rebound absorber comprising a cylindrical barrel, a plunger slidably positioned in said cylindrical barrel and having an opening extending therethrough, a bar extending through the opening in said plunger and attached thereto, said bar also extending out of one end of said cylindrical barrel, means for permitting attachment of said bar and cylindrical barrel to an automobile, the lower end of said bar extending through said plunger having a longitudinal opening arranged therein for permitting air upon either side of said plunger to pass to the opposite side of said plunger.

2. A shock and rebound absorber comprising a cylindrical barrel, a plunger slidably positioned in said cylindrical barrel and having an opening extending therethrough, a bar extending through the opening in said plunger and attached thereto, said bar also extending out of one end of said cylindrical barrel, means for permitting attachment of said bar and cylindrical barrel to an automobile, the lower end of said bar extending through said plunger having a longitudinal opening arranged therein for permitting air upon either side of said plunger to pass to the opposite side of said plunger, and a plug detachably connected to the lower end of said bar and having a restricted opening communicating with the longitudinal opening in the lower end of the bar for governing the flow of air from either side of said plunger.

3. A shock and rebound absorber comprising a cylindrical barrel, a plunger slidably positioned in said cylindrical barrel and having an opening extending centrally therethrough, a bar having one end thereof extending through the opening in said plunger while its opposite end extends through one end of said cylindrical barrel, means for attaching said bar to said plunger, means for permitting attachment of said bar and cylindrical barrel to an automobile, the lower end of said bar having a longitudinal bore arranged therein and communicating at its upper end with a transverse bore arranged above the plunger, a plug screw threadedly mounted in the lower end of said bar and having a restricted opening for governing the flow of air from either side of said plunger to the opposite side thereof.

4. A shock and rebound absorber comprising a cylindrical barrel, a bar extending through one end of said cylindrical barrel and having a shoulder arranged upon the end thereof extending into said barrel, a pair of flexible members arranged upon said bar between the shoulder thereof and the end received in said barrel, a nut screw threadedly mounted upon the lower end of said bar for holding said yieldable members rigidly connected to said bar, said yieldable members having annular flanges provided thereon arranged to extend away from each other, and means carried by the lower end of said bar for directing air upon the interior surfaces of the annular flanges formed on said flexible members for forcing said flanges against the interior of said cylindrical barrel to prevent leakage beween said flexible members and said barrel.

5. A shock and rebound absorber comprising a cylindrical barrel, a bar extending through one end of said cylindrical barrel and having a shoulder arranged upon the end thereof extending into said barrel, a pair of flexible members arranged upon said bar between the shoulder thereof and the end received in said barrel, a nut screw threadedly mounted upon the lower end of said bar for holding said yieldable members rigidly connected to said bar, said yieldable members having annular flanges provided thereon arranged to extend away from each other, and means carried by the lower end of said bar for directing air upon the interior surfaces of the annular flanges formed on said flexible members for forcing said flanges against the interior of said cylindrical barrel to prevent leakage between said flexible members and said barrel, said bar having a restricted opening formed in the lower end thereof and communicating at both sides of said flexible members for slowly permitting air to pass from one side of said flexible members to the opposite sides thereof.

6. A shock and rebound absorber comprising a cylindrical barrel, a bar extending into said barrel at one end thereof, a shoulder formed on said bar adjacent the end thereof extending into said barrel, a pair of flexible members arranged upon said bar and having annular flanges provided thereon extending away from each other, a pair of cup shaped members one received in each of said annular flanges formed on said yieldable members, said cup-shaped members also being mounted upon the end of said bar extending into said cylindrical barrel, said cup-shaped members having annular grooves formed in the periphery thereof at the annular flanges of said flexible members, said cup-shaped members having openings extending through the walls thereof and communicating with said grooves, and a nut threaded upon the lower end of said bar for clamping the cup-shaped and yieldable members between the same and the shoulder formed on said bar.

7. A shock and rebound absorber comprising a cylindrical barrel, a bar extending into said barrel at one end thereof, a shoulder formed on said bar adjacent the end thereof extending into said barrel, a pair of flexible members arranged upon said bar and having annular flanges provided thereon extending away from each other, a pair of cup-shaped members one received in each of said annular flanges formed on said yieldable members, said cup-shaped members also being mounted upon the end of said bar extending into said cylindrical barrel, said cup-shaped members having annular grooves formed in the periphery thereof at the annular flanges of said flexible members, said cup-shaped members having openings extending through the walls thereof and communicating with said grooves, and a nut threaded upon the lower end of said bar for clamping the cup-shaped and yieldable members between the same and the shoulder formed on said bar, the lower end of said bar having a longitudinal opening extending therethrough for slowly permitting air to pass from either side of said cup-shaped and flexible members to the opposite sides thereof In testimony whereof, we have affixed our signatures.

LEOPOLD STANZEL.
CHRISTIAN C. JOHNSON.